(12) United States Patent
Scoca et al.

(10) Patent No.: US 7,492,666 B2
(45) Date of Patent: Feb. 17, 2009

(54) SONAR SYSTEM HAVING MULTIPLE PULSE SEQUENCES

(75) Inventors: Anthony L. Scoca, Hicksville, NY (US); Jerry G. Klein, New York, NY (US); James G. Huber, N. Babylon, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 247 days.

(21) Appl. No.: 10/940,477

(22) Filed: Sep. 14, 2004

(65) Prior Publication Data
US 2006/0056273 A1 Mar. 16, 2006

(51) Int. Cl.
*G01S 15/08* (2006.01)
(52) U.S. Cl. .......................................... 367/99; 367/87
(58) Field of Classification Search ................... 367/87, 367/88, 99, 101; 342/123, 136
See application file for complete search history.

(56) References Cited

U.S. PATENT DOCUMENTS

| 3,614,719 | A | * | 10/1971 | Treacy | 367/101 |
| 3,683,325 | A | * | 8/1972 | Vlahos | 367/93 |
| 4,207,620 | A | | 6/1980 | Morgera | |
| 4,553,221 | A | | 11/1985 | Hyatt | |
| 4,562,438 | A | * | 12/1985 | Rouse et al. | 342/201 |
| 4,686,655 | A | | 8/1987 | Hyatt | |
| 4,754,282 | A | | 6/1988 | Edelblute et al. | |
| 4,837,578 | A | | 6/1989 | Gammell | |
| 4,870,628 | A | | 9/1989 | Zielinski | |
| 4,905,207 | A | | 2/1990 | Fellinger et al. | |
| 5,077,699 | A | | 12/1991 | Passamante et al. | |
| 5,260,910 | A | | 11/1993 | Panton | |
| 5,333,129 | A | | 7/1994 | Buckingham | |
| 5,566,134 | A | | 10/1996 | Dufault | |
| 5,608,689 | A | | 3/1997 | Capell, Sr. | |
| 6,298,009 | B1 | | 10/2001 | Stringer | |
| 6,549,853 | B2 | | 4/2003 | Chakraborty et al. | |
| 6,678,209 | B1 | | 1/2004 | Peng et al. | |

* cited by examiner

*Primary Examiner*—Ian J. Lobo
(74) *Attorney, Agent, or Firm*—Dicke, Billig & Czaja, PLLC

(57) ABSTRACT

A sonar system comprises a transmitter adapted to provide pulse sequences, wherein each of the pulse sequences includes pulses that reflect off an object, a receiver adapted to receive the reflected pulses, and a processor. The processor is configured to transmit a first pulse sequence via the transmitter to obtain a first distance to the object in a first distance range and to transmit a second pulse sequence via the transmitter to obtain a second distance to the object in a second distance range. The processor is configured to transmit the second pulse sequence in response to being unable to obtain the first distance to the object in the first distance range.

34 Claims, 8 Drawing Sheets

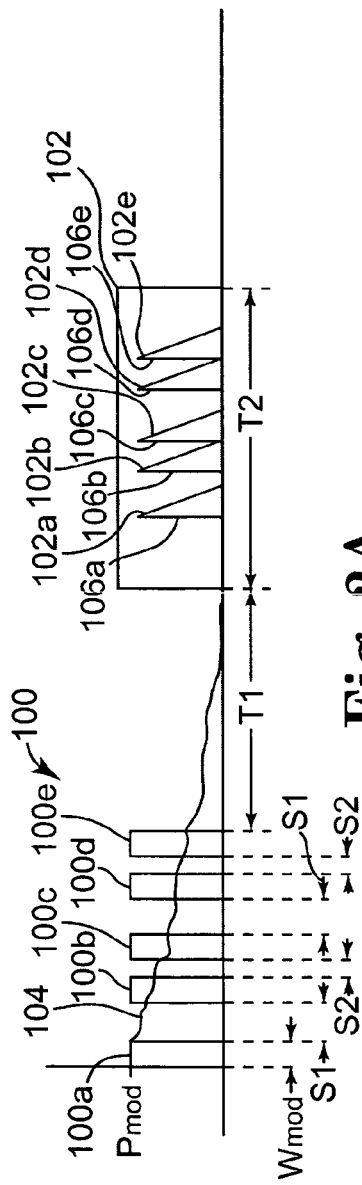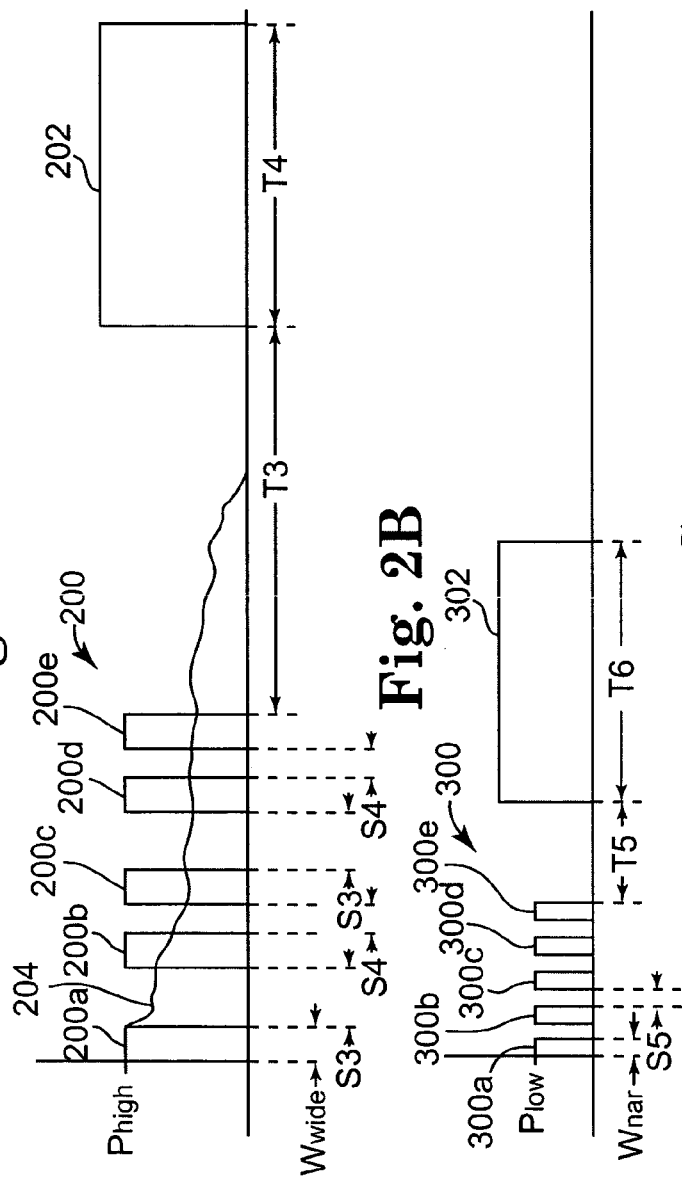
Fig. 2A
Fig. 2B
Fig. 2C

SONAR SYSTEM HAVING MULTIPLE PULSE SEQUENCES

GOVERNMENT INTEREST

This invention was made with Government support under Government Contract No. N00030-C-04-0014, program Trident SSBN Navigation. The Government has certain rights in the invention.

BACKGROUND

Sonar systems are used to detect, navigate, track, classify, and locate objects in water using sound waves. Sonar systems can be used in defense and civilian applications. Military applications include using underwater sound for depth detection, navigation, ship and submarine detection, ranging, tracking, underwater communications, mine detection, and guidance and control. Civilian applications include using underwater sound for depth detection, navigation, object location such as fish finding, bottom topographic mapping, underwater beacons, wave-height measurement, underwater imaging, telemetry and control, underwater communications, ship handling and docking, anti-stranding alerts for ships, and vessel velocity measurement.

A typical active sonar system includes a transmitter to generate sound waves and a receiver to sense reflected sound waves. The transmitter includes a transducer that generates sound waves and the receiver includes a transducer commonly referred to as a hydrophone that receives reflected sound waves. A short burst of energy, referred to as a sonar pulse, is generated by the transmitter. The sonar pulse travels to a target object and is reflected by the target object. The reflected sonar pulse is received by the hydrophone and the sonar system measures the time between the transmitted sonar pulse and the received reflected sonar pulse to determine the distance to the object. Often, each sonar pulse is transmitted, reflected, and received before transmitting another sonar pulse.

Typically, a substantial number of transmissions are needed to enable integration of the reflected sonar pulses and to accurately determine the distance to an object. Transmitting and receiving a substantial number of sonar pulses can be a time consuming process. Also, transmitting a substantial number of sonar pulses may give away the transmitters position, which is unacceptable in some military applications. Other problems encountered include high false alarm rates, inaccuracies, and false measurements. These problems may be due to transmission reverberations being received by the hydrophone and interpreted as reflected sonar pulses or sonar pulses bouncing from the bottom to the surface and back to the bottom, in double and triple bounces, before being received by the hydrophone.

For these and other reasons there is a need for the present invention.

SUMMARY

One aspect of the present invention provides a sonar system comprising a transmitter adapted to provide pulse sequences, wherein each of the pulse sequences includes pulses that reflect off an object, a receiver adapted to receive the reflected pulses, and a processor. The processor is configured to transmit a first pulse sequence via the transmitter to obtain a first distance to the object in a first distance range and to transmit a second pulse sequence via the transmitter to obtain a second distance to the object in a second distance range. The processor is configured to transmit the second pulse sequence in response to being unable to obtain the first distance to the object in the first distance range.

BRIEF DESCRIPTION OF THE DRAWINGS

FIG. 2A is a diagram illustrating a sonar pulse sequence and a receive window for finding a depth candidate in a moderate depth range.

FIG. 2B is a diagram illustrating a sonar pulse sequence and a receive window for finding a depth candidate in a deep depth range.

FIG. 2C is a diagram illustrating a sonar pulse sequence and a receive window for finding a depth candidate in a shallow depth range.

DETAILED DESCRIPTION

In the following Detailed Description, reference is made to the accompanying drawings, which form a part hereof, and in which is shown by way of illustration specific embodiments in which the invention may be practiced. In this regard, directional terminology, such as "top," "bottom," "front," "back," "leading," "trailing," etc., is used with reference to the orientation of the Figure(s) being described. Because components of embodiments of the present invention can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

Figure 1:
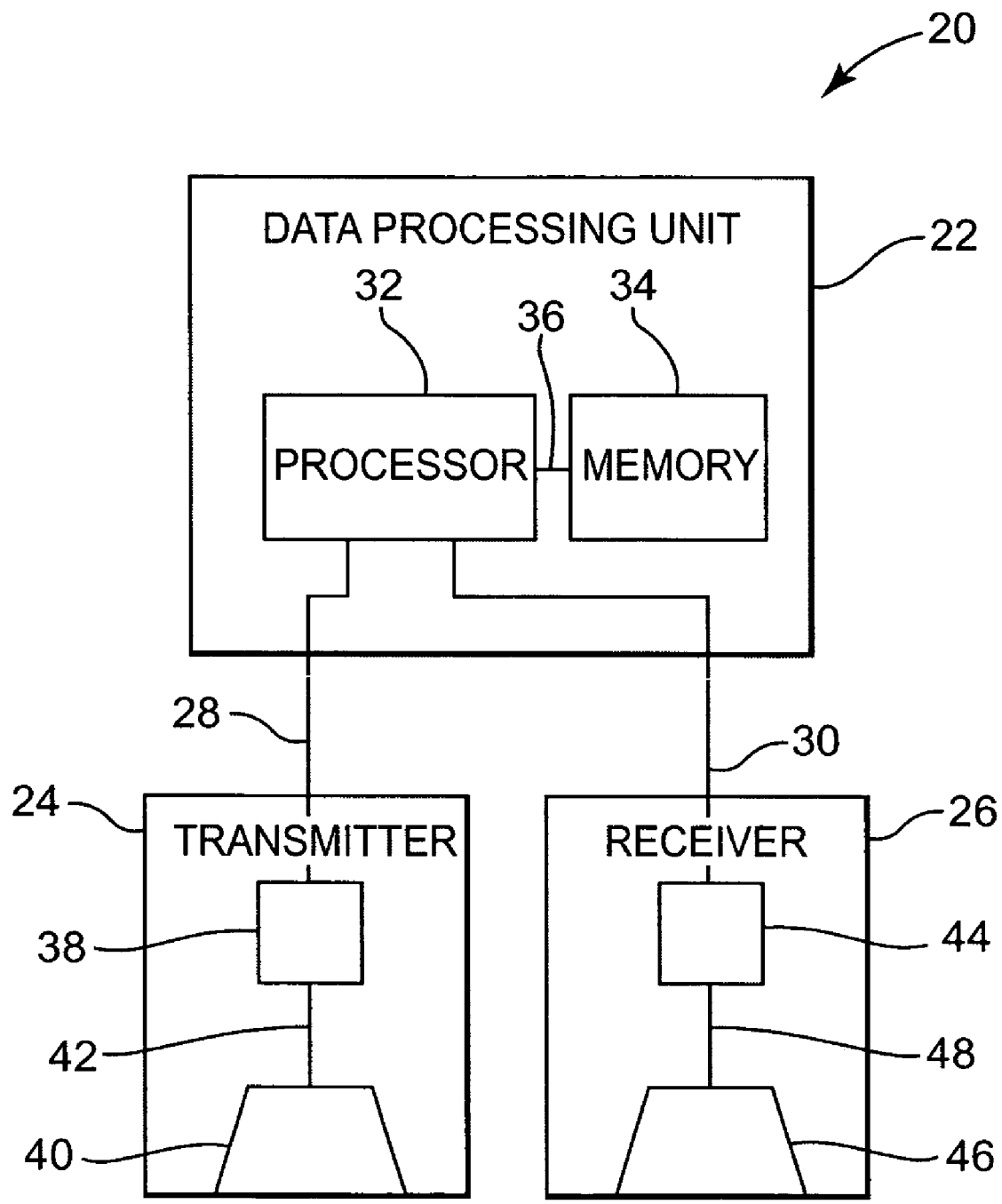
FIG. 1 is a diagram illustrating one embodiment of a sonar system.

FIG. 1 is a diagram illustrating one embodiment of a sonar system 20. Sonar system 20 includes a data processing unit 22, a transmitter 24, and a receiver 26. Data processing unit 22 is electrically coupled to transmitter 24 via conductive path 28 and to receiver 26 via conductive path 30. Sonar system 20 can be part of any suitable vessel, such as a surface ship, a submarine, or any other water craft, or part of any suitable equipment, such as a depth finder, or any autonomous on the water device.

Data processing unit 22 includes a processor 32 and a memory 34. Processor 32 is electrically coupled to memory 34 via conductive path 36. Also, processor 32 is electrically coupled to transmitter 24 via conductive path 28 and to receiver 26 via conductive path 30. Processor 32 can be any suitable computing unit, such as a micro-processor, microcontroller, digital signal processor or main frame computing system. Memory 34 can be any suitable memory or combination of memories including random access memory (RAM), read only memory (ROM), programmable read only memory (PROM), and electrically erasable programmable read only memory (EEPROM).

Transmitter 24 includes transmitter circuitry 38 and a transmitter transducer 40. Transmitter circuitry 38 is electrically coupled to processor 32 via conductive path 28 and to transmitter transducer 40 via conductive path 42. Transmitter circuitry 38 receives electrical signals from processor 32 via conductive path 28 and supplies corresponding electrical signals to transmitter transducer 40 via conductive path 42. Transmitter transducer 40 converts received electrical signals to sound waves, i.e. sonar pulses.

Receiver 26 includes receiver circuitry 44 and a hydrophone or receiver transducer 46. Receiver circuitry 44 is electrically coupled to processor 32 via conductive path 30 and to receiver transducer 46 via conductive path 48. Receiver transducer 46 receives reflected sound waves, i.e., reflected sonar pulses, and converts received reflected sonar pulses to electrical signals. The electrical signals are received by receiver circuitry 44, which supplies corresponding electrical signals to processor 32.

Sonar system 20 is a depth detection system that rapidly, accurately, and covertly determines the distance or depth from sonar system 20 to the bottom of a body of water, such as the ocean. Sonar system 20 includes a software program that is stored in memory 34 and executed by processor 32. Processor 32 executes the software program to transmit sonar pulses via transmitter 24, receive electrical signals from receiver 26, and process the received electrical signals to obtain a depth result.

In operation, sonar system 20 transmits one or more sonar pulse sequences to the bottom of the body of water to obtain a depth result. Each sonar pulse sequence includes multiple sonar pulses. Processor 32 transmits a sonar pulse sequence in electrical signals to transmitter 24. Transmitter circuitry 38 receives the sonar pulse sequence and transmits corresponding electrical signals to transmitter transducer 40, which converts the received corresponding electrical signals into sonar pulses. In one embodiment, transmitter 24 transmits the sonar pulses directly toward the bottom of the body of water to enhance covert operation of sonar system 20.

After the sonar pulses in a sonar pulse sequence are transmitted, processor 32 opens a receive window to receive electrical signals from receiver 26. Reflected sonar pulses are received by receiver transducer 46, which converts the received reflected sonar pulses to electrical signals. Receiver circuitry 44 receives the electrical signals from receiver transducer 46 and provides corresponding electrical signals to processor 32. Processor 32 processes the received corresponding electrical signals to obtain a depth candidate.

Processor 32 executes the software program to set sonar pulse characteristics, sonar pulse sequence characteristics, and receive window characteristics to search for a depth candidate in a selected depth range. If a depth candidate is not found in the selected depth range, processor 32 provides another set of sonar pulses in another sonar pulse sequence and opens another receive window to search for a depth candidate in another depth range. Once a depth candidate is obtained, the depth candidate is processed to reduce false alarms and refine the distance measurement prior to declaring a depth result.

FIGS. 2A-2C are diagrams illustrating sonar pulse sequences, indicated at 100, 200, and 300, and receive windows 102, 202, and 302 in one embodiment of sonar system 20. Sonar system 20 includes three sonar pulse sequences 100, 200, and 300 and three receive windows 102, 202, and 302. Sonar pulse sequence 100 and receive window 102 are used to search for a depth candidate in a moderate depth range. Sonar pulse sequence 200 and receive window 202 are used to search for a depth candidate in a deep depth range, and sonar pulse sequence 300 and receive window 302 are used to search for a depth candidate in a shallow depth range. In other embodiments, the sonar system can include any suitable number of sonar pulse sequences and receive windows, such as more than three, to search for a depth candidate and obtain a depth result.

FIG. 2A is a diagram illustrating sonar pulse sequence 100 and receive window 102. Sonar pulse sequence 100 includes sonar pulses 100*a*-100*e*. Sonar pulses 100*a*-100*e* reflect off items, such as the water, particles in the water, and schools of fish to create reverberations 104. Processor 32 opens receive window 102 after the last sonar pulse 100*e* in sonar pulse sequence 100 to receive electrical signals corresponding to reflected sonar pulses, indicated at 102*a*-102*e*. The reflected sonar pulses 102*a*-102*e* correspond to sonar pulses 100*a*-100*e*, where reflected sonar pulse 102*a* corresponds to sonar pulse 100*a*, reflected sonar pulse 102*b* corresponds to sonar pulse 100*b*, reflected sonar pulse 102*c* corresponds to sonar pulse 100*c*, reflected sonar pulse 102*d* corresponds to sonar pulse 100*d*, and reflected sonar pulse 102*e* corresponds to sonar pulse 100*e*. Reflected sonar pulses 102*a*-102*e* are received in the presence of ambient noise (not shown) that is created in part by weather above the surface of the water and wave motion.

FIG. 2B is a diagram illustrating sonar pulse sequence 200 and receive window 202. Sonar pulse sequence 200 includes sonar pulses 200*a*-200*e*. Sonar pulses 200*a*-200*e* reflect off items, such as the water, particles in the water, and schools of fish to create reverberations 204. Processor 32 opens receive window 202 after the last sonar pulse 200*e* in sonar pulse sequence 200 to receive electrical signals corresponding to reflected sonar pulses. Receive window 202 is held open for a longer time than receive window 102 to receive stretched reflected sonar pulses in the deep depth range. The reflected sonar pulses are stretched due to the sonar pulse beam pattern propagating to a deeper depth. As the beam pattern propagates to a deeper depth, the beam pattern spreads out and is reflected off the bottom to provide stretched reflected sonar pulses.

FIG. 2C is a diagram illustrating sonar pulse sequence 300 and receive window 302. Sonar pulse sequence 300 includes sonar pulses 300*a*-300*e*. Each of the sonar pulses 300*a*-300*e* is at a low energy level, which minimizes reverberations. Processor 32 opens receive window 302 after the last sonar pulse 300*e* in sonar pulse sequence 300.

Each of the sonar pulse sequences 100, 200, and 300 includes five sonar pulses, indicated at 100*a*-100*e*, 200*a*-200*e*, and 300*a*-300*e*, respectively. In other embodiments, each of the sonar pulse sequences 100, 200, and 300 includes any suitable number of sonar pulses, such as from 3 to 10 sonar pulses. Also, in other embodiments, each of the sonar pulse sequences 100, 200, and 300 includes a different number of sonar pulses as compared to another one of the sonar pulse sequences 100, 200, and 300.

Processor 32 executes the software program to select a search depth range and set values for sonar pulse characteristics, sonar pulse sequence characteristics, and receive window characteristics. Sonar pulse characteristics include the sonar pulse energy, which is related to the sonar pulse width and the magnitude of the sonar pulse pressure, referred to as the sonar pulse power. Sonar pulse sequence characteristics include inter-pulse spacing of sonar pulses in a sonar pulse sequence. Receive window characteristics include the receive window width and the time between the last sonar pulse in the sonar pulse sequence and opening the receive window.

Sonar pulse characteristic values are different for each set of sonar pulses 100a-100e, 200a-200e, and 300a-300e. Each of the sonar pulses 100a-100e is at a moderate energy level and includes a moderate width (Wmod) and a moderate power level (Pmod). Each of the sonar pulses 200a-200e is at a high energy level and includes a wide width (Wwide) and a high power level (Phigh). In contrast, each of the sonar pulses 300a-300e is at a low energy level and includes a narrow width (Wnar) and a low power level (Plow). In one embodiment, each of the sonar pulses 100a-100e includes a wide width similar to wide width (Wwide) of sonar pulses 200a-200e.

Sonar pulse sequence characteristic values are different for each sonar pulse sequence 100, 200, and 300. Sonar pulse sequences 100 and 200 include two inter-pulse spacing values to reduce ambiguity in received reflected sonar pulses. Sonar pulse sequence 100 includes inter-pulse spacing S1 and S2 and sonar pulse sequence 200 includes inter-pulse spacing S3 and S4. In sonar pulse sequence 100, inter-pulse spacing S1 is greater than S2. In sonar pulse sequence 200, inter-pulse spacing S3 is greater than S4. As between sonar pulse sequences 100 and 200, inter-pulse spacing S3 is greater than inter-pulse spacing S1 and inter-pulse spacing S4 may be greater than inter-pulse spacing S2. The greater inter-pulse spacing in sonar pulse sequence 200 is used to search for a depth candidate in a deep depth range and reduce problems associated with the sonar pulse stretching. The moderate inter-pulse spacing in sonar pulse sequence 100 is used to search for a depth candidate in a moderate depth range. In contrast, sonar pulse sequence 300 includes one inter-pulse spacing S5, which is small to search for a depth candidate in a shallow depth range. In one embodiment, inter-pulse spacing S5 is less than any other inter-pulse spacing S1, S2, S3, and S4. In one embodiment, moderate depth range inter-pulse spacing value S1 is 1.5 or more times wider than shallow inter-pulse spacing value S5, and deep depth range inter-pulse spacing value S3 is 2 or more times wider than shallow inter-pulse spacing value S5.

Receive window characteristic values are different for each receive window 102, 202, and 302. Receive window 102 is opened a time T1 after the last sonar pulse 100e in sonar pulse sequence 100 and receive window 102 remains open for a time T2. Receive window 202 is opened a time T3 after the last sonar pulse 200e in sonar pulse sequence 200 and receive window 202 remains open for a time T4. Receive window 302 is opened a time T5 after the last sonar pulse 300e in sonar pulse sequence 300 and receive window 302 remains open for a time T6. As between receive windows 102 and 202, time T3 is greater than time T1 and time T4 is greater than time T2. The greater times T3 and T4 are used to open receive window 202 later and search for a depth candidate in a deep depth range, including receiving stretched reflected sonar pulses. The moderate times T1 and T2 are used to open receive window 102 in a moderate time frame and search for a depth candidate in a moderate depth range. In contrast, receive window 302 is opened in a short time T5, which is less than time T1 and time T3, to search for a depth candidate in a shallow depth range. Also, receive window 302 is closed in a short time T6, which is less than time T2 and time T4, as sonar pulse sequence 300 is shorter than sonar pulse sequence 100 and sonar pulse sequence 200.

Sonar pulses 100a-100e are moderate energy sonar pulses in a moderately spaced sonar pulse sequence 100. Receive window 102 is opened a moderate length of time after the last sonar pulse 100e in sonar pulse sequence 100 and left open a moderate length of time to search for reflected sonar pulses in a moderate depth range. Sonar pulses 200a-200e are high energy sonar pulses in a widely spaced sonar pulse sequence 200. Receive window 202 is opened a greater length of time after the last sonar pulse 200e in sonar pulse sequence 200 and left open a greater length of time to search for reflected sonar pulses in a deep depth range. Sonar pulses 300a-300e are low energy sonar pulses in a narrowly spaced sonar pulse sequence 300. Receive window 302 is opened a short length of time after the last sonar pulse 300e in sonar pulse sequence 300 and left open a short length of time to search for reflected sonar pulses in a shallow depth range.

In operation, processor 32 transmits one of the sonar pulse sequences 100, 200, and 300 and opens one of the receive windows 102, 202, and 302 to search for a depth candidate in a selected depth range. To search for a depth candidate in a moderate depth range, processor 32 transmits sonar pulse sequence 100 and opens receive window 102. To search for a depth candidate in a deep depth range, processor 32 transmits sonar pulse sequence 200 and opens receive window 202. Processor 32 transmits sonar pulse sequence 300 and opens receive window 302 to search for a depth candidate in a shallow depth range. In one embodiment, the moderate depth range is from 350 fathoms to 2300 fathoms, the deep depth range is from 2000 fathoms to the maximum depth of the ocean, and the shallow depth range is from 100 fathoms to 400 fathoms. In other embodiments, the moderate, deep, and shallow depth ranges can be any suitable distance ranges, such as a moderate depth range of 35 fathoms to 230 fathoms, a deep depth range of 200 fathoms to 400 fathoms, and a shallow depth range of 10 to 40 fathoms.

Processor 32 receives electrical signals corresponding to reflected sonar pulses during receive windows 102, 202, and 302. Processor 32 receives electrical signals corresponding to reflected sonar pulses 102a-102e during receive window 102 if the bottom of the body of water is detected in the moderate depth range. Processor 32 receives electrical signals corresponding to reflected sonar pulses during receive window 202 if the bottom of the body of water is detected in the deep depth range, and processor 32 receives electrical signals corresponding to reflected sonar pulses during receive window 302 if the bottom of the body of water is detected in the shallow depth range. Processor 32 processes the received electrical signals to obtain a depth candidate and a depth result.

To obtain a depth candidate, processor 32 samples the received electrical signals and digitizes each sample. Processor 32 calculates amplitude correlations for groups of reflected sonar pulses. In one embodiment, amplitude correlations are calculated for groups of three reflected sonar pulses as shown in Equations I and II.

$$RO(j) = \sum_i A(j+i) * A(j+KL+i) * A(j+KL+KM+i) \quad \text{Equation I}$$

$$RE(j) = \sum_i A(j+i) * A(j+KM+i) * A(j+KL+KM+i) \quad \text{Equation II}$$

In Equation I, RO is the amplitude correlation for a group of three reflected sonar pulses beginning with an odd numbered pulse. RO is equal to a summation of amplitude products for sample j over summation variable i. Sample amplitudes from three consecutive reflected sonar pulses are multiplied to obtain one amplitude product. In one embodiment, i is varied from minus four to plus four to obtain nine amplitude products. That is, four amplitude products prior to sample j, the sample j amplitude product, and four amplitude products after sample j. The nine amplitude products are summed to obtain RO for sample j.

Sample amplitudes are taken from three consecutive reflected sonar pulses, where A is the amplitude of a sample, K is the sampling rate used to sample the received electrical signals in samples per second, L is a first pulse spacing from the beginning of an odd numbered pulse to the beginning of an even numbered pulse in seconds, and M is a second pulse spacing from the beginning of an even numbered pulse to the beginning of an odd numbered pulse in seconds. KL is the number of samples in first pulse spacing L and KM is the number of samples in second pulse spacing M.

In sonar pulse sequence 100, first pulse spacing L equals Wmod+S1 and second pulse spacing M equals Wmod+S2. In sonar pulse sequence 200, first pulse spacing L equals Wwide+S3 and second pulse spacing M equals Wwide+S4. In sonar pulse sequence 300, first pulse spacing L equals Wnar+S5 and second pulse spacing M equals Wnar+S5.

In Equation II, RE is the amplitude correlation for a group of reflected sonar pulses beginning with an even numbered pulse. RE is equal to a summation of amplitude products for sample j over summation variable i. Sample amplitudes are taken from three consecutive reflected sonar pulses, where A is the amplitude of a sample, KL is the number of samples in first pulse spacing L, and KM is the number of samples in second pulse spacing M. Sample amplitudes from three consecutive reflected sonar pulses are used to obtain one amplitude product. In one embodiment, i is varied from minus four to plus four to obtain nine amplitude products. That is, four amplitude products prior to sample j, the sample j amplitude product, and four amplitude products after sample j. The nine amplitude products are summed to obtain RE for data sample j.

Processor 32 obtains amplitude correlations and calculates amplitude correlation product values RP. An amplitude correlation product value RP is equal to amplitude correlations beginning with odd numbered pulses RO multiplied times amplitude correlations beginning with even numbered pulses RE. The number of product terms is based on the number of sonar pulses transmitted in a sonar pulse sequence and the number of reflected sonar pulses used to calculate the amplitude correlations.

In one embodiment, five sonar pulses are transmitted in each sonar pulse sequence. The five reflected sonar pulses are taken three at a time to obtain three amplitude correlations, namely, amplitude correlations for the first, second, and third sonar pulses, the second, third, and fourth sonar pulses, and the third, fourth, and fifth sonar pulses. These three amplitude correlations are multiplied together to obtain the numerator of the amplitude correlation product value RP for a given sample h, as shown in Equation III.

$$RP(h) = \frac{RO(h) * RE(h + KL) * RO(h + KL + KM)}{[R(h)_{max}]^n} \qquad \text{Equation III}$$

In Equation III, the denominator is a normalizing factor, where n is the number of product terms in the numerator and R is the maximum amplitude correlation value. In other embodiments, any suitable number of sonar pulses can be transmitted and any suitable number of amplitude correlations obtained to calculate the amplitude correlation product value RP.

Processor 32 uses amplitude correlation product values RP to find the leading edges of received reflected sonar pulses, such as leading edges 106a-106e of reflected sonar pulses 102a-102e. The time between transmitted sonar pulses, such as 100a-100e, and the leading edges of reflected sonar pulses, such as leading edges 106a-106e of reflected sonar pulses 102a-102e, is related to the distance or depth from the sonar system 20 to the bottom of the body of water. Processor 32 compares the maximum amplitude correlation product value RP from the received reflected sonar pulses to an amplitude correlation product threshold value. If the maximum correlation product value RP is greater than the amplitude correlation product threshold value, processor 32 determines the distance from sonar system 20 to the bottom of the body of water using the time between transmitted sonar pulses and the leading edges of reflected sonar pulses. Processor 32 stores the distance as a depth candidate. If the maximum correlation product value RP is less than the correlation product threshold value, processor 32 continues processing.

Figure 3:
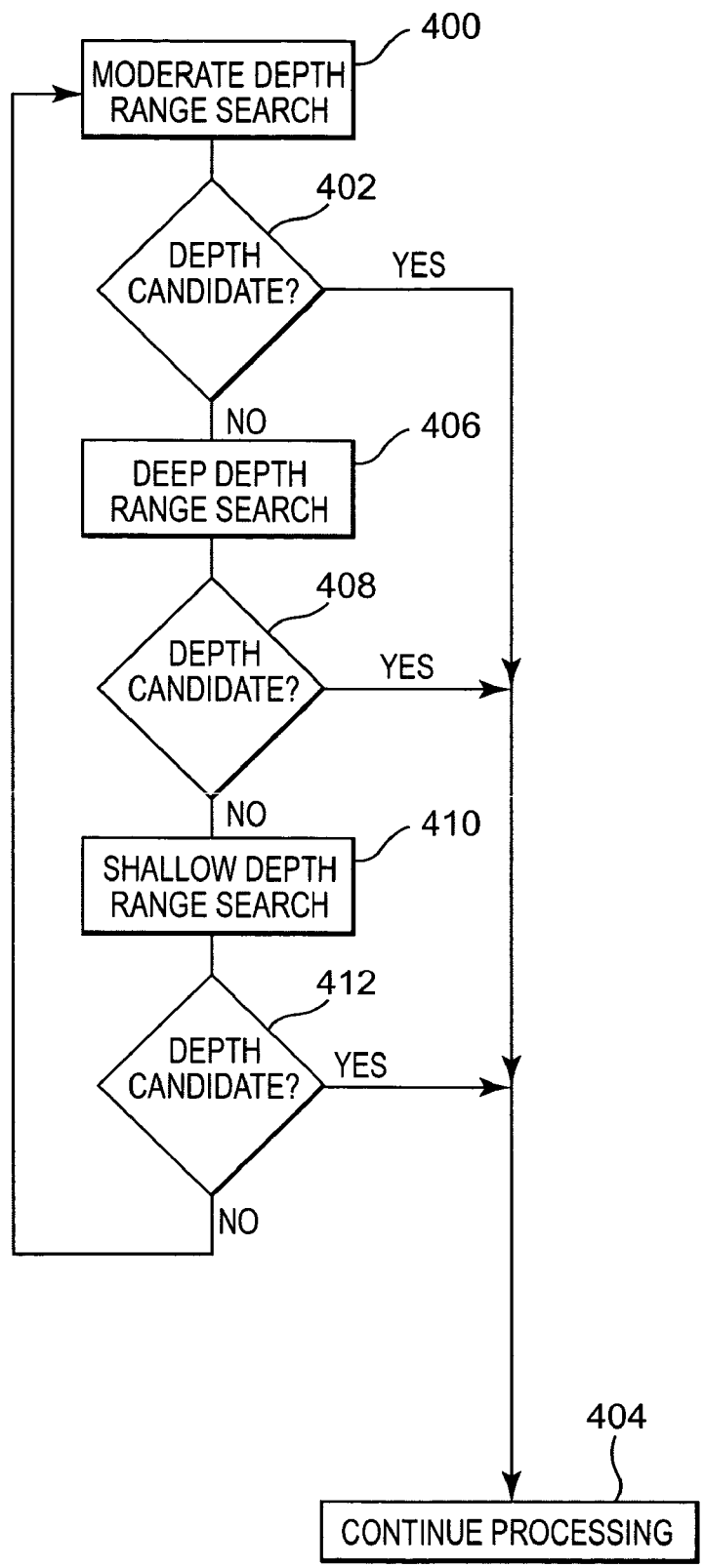
FIG. 3 is a flow diagram illustrating normal processing in one embodiment of a sonar system.

FIG. 3 is a flow diagram illustrating normal processing in one embodiment of sonar system 20. At 400, sonar system 20 executes a moderate depth range search to find a depth candidate. Sonar system 20 transmits sonar pulse sequence 100 and processor 32 opens receive window 102. Processor 32 samples and processes electrical signals received during the open receive window 102. At 402, if a depth candidate is found in the moderate depth range search, sonar system 20 continues processing at 404. If a depth candidate is not found in the moderate depth range search, processing continues at 406 with a deep depth range search.

In the deep depth range search at 406, sonar system 20 transmits sonar pulse sequence 200 and processor 32 opens receive window 202. Processor 32 samples and processes electrical signals received during the open receive window 202. At 408, if a depth candidate is found in the deep depth range search, sonar system 20 continues processing at 404. If a depth candidate is not found in the deep depth range search, processing continues at 410 with a shallow depth range search.

In the shallow depth range search at 410, sonar system 20 transmits sonar pulse sequence 300 and processor 32 opens receive window 302. Processor 32 samples and processes electrical signals received during the open receive window 302. At 412, if a depth candidate is found in the shallow depth range search, sonar system 20 continues processing at 404. If a depth candidate is not found in the shallow depth range search, sonar system 20 repeats the series of searches beginning with the moderate depth range search at 400 until a depth candidate is found. In one embodiment, a depth candidate may be found by lowering the amplitude correlation product threshold to find a depth candidate and confirming the depth candidate with multiple distance measurements, such as when the bottom is sloping.

Sonar system 20 continues processing depth candidates at 404. In one embodiment, sonar system 20 confirms a depth candidate is not a false alarm by comparing the magnitude of one or more electrical signals that resulted in the depth candidate to a signal strength threshold. If the magnitude of the one or more electrical signals is greater than the signal strength threshold, the depth candidate is confirmed as a valid depth candidate and not a false alarm. If the magnitude of the one or more electrical signals is less than the signal strength threshold, the depth candidate is discarded and processing continues to find another depth candidate. In one embodiment, sonar system 20 refines the depth candidate distance by executing look back processing on the electrical signals processed to find the depth.

Figure 4A:
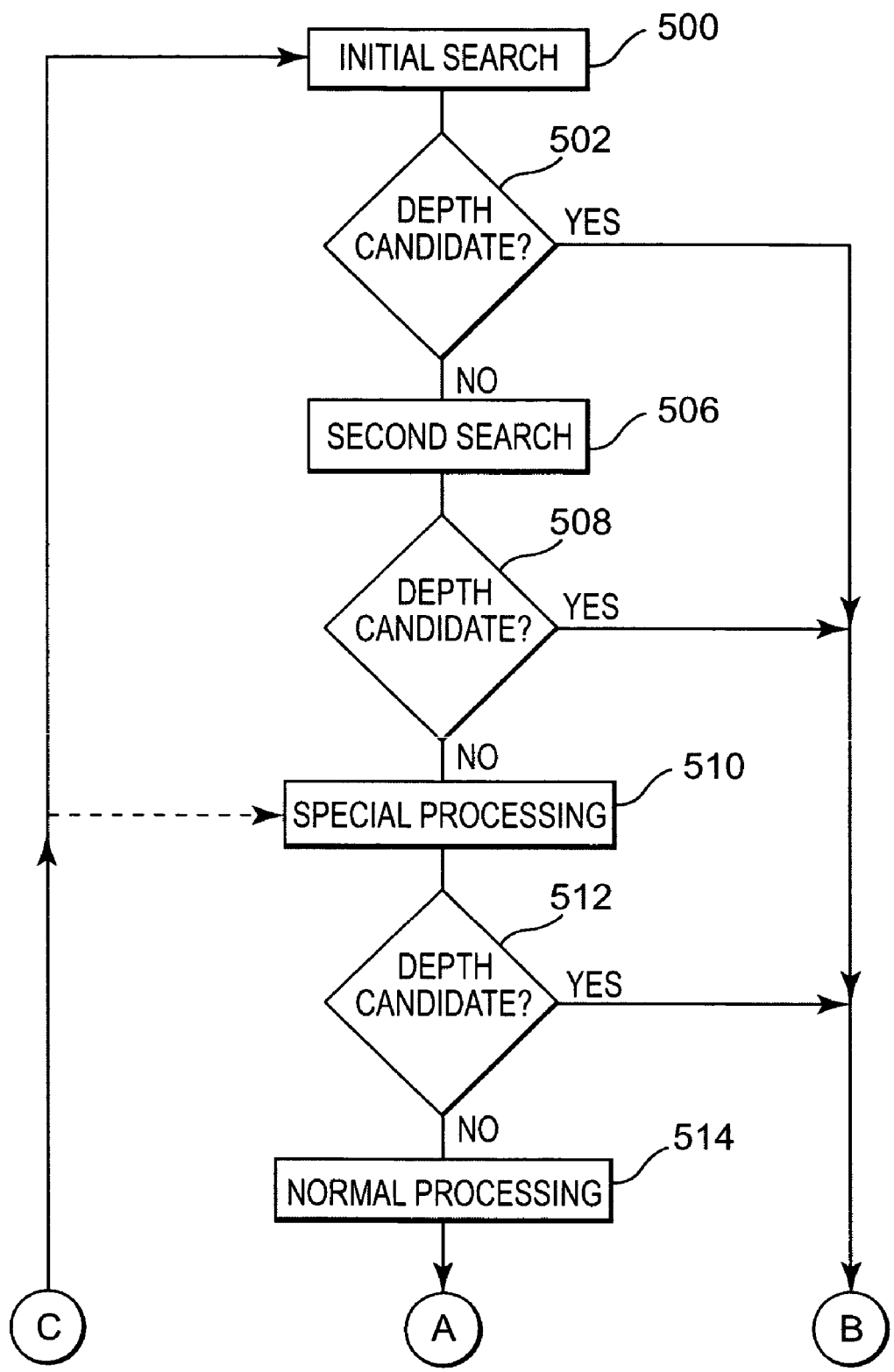
FIG. 4A is a flow diagram illustrating one part of the system process flow in one embodiment of a sonar system.
Figure 4B:
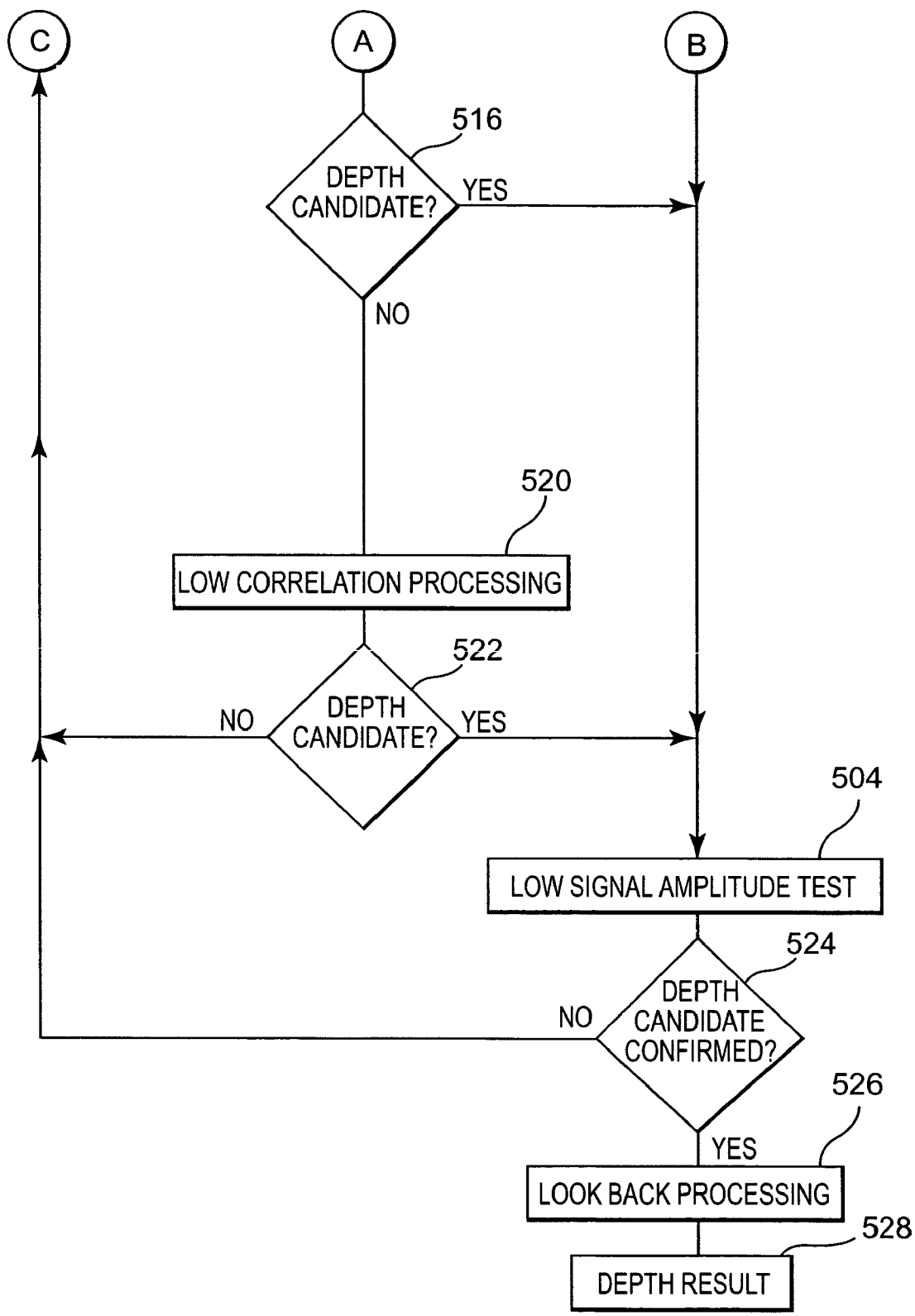
FIG. 4B is a flow diagram illustrating another part of the system process flow in one embodiment of a sonar system.

FIGS. 4A and 4B are flow diagrams illustrating the system process flow in one embodiment of sonar system 20. At 500, sonar system 20 executes an initial search to find a depth candidate in a moderate depth range. Sonar system 20 transmits sonar pulse sequence 100 and processor 32 opens receive window 102. Processor 32 samples and digitizes electrical signals received during the open receive window 102. Processor 32 calculates amplitude correlations and amplitude correlation product values from the digitized samples to find a depth candidate. At 502, if a depth candidate is found in the initial moderate depth range search at 500, sonar system 20 continues processing at 504 (shown in FIG. 4B). If a depth candidate is not found in the initial moderate depth range search at 500, processing continues at 506 with a second search. In one embodiment, in the initial search at 500, processor 32 opens receive window 102 earlier and leaves receive window 102 open longer than in other moderate depth range searches to find depth candidates in a shallower depth range as well as the moderate depth range.

In the second search at 506, sonar system 20 executes a deep depth range search. Sonar system 20 transmits sonar pulse sequence 200 and processor 32 opens receive window 202. Processor 32 samples and digitizes electrical signals received during the open receive window 202. Processor 32 calculates amplitude correlations and amplitude correlation product values from the digitized samples to find a depth candidate. At 508, if a depth candidate is found in the deep depth range search at 506, sonar system 20 continues processing at 504. If a depth candidate is not found in the deep depth range search at 506, processing continues at 510 with special processing.

In special processing at 510, sonar system 20 including processor 32 executes moderate, deep, and shallow depth range searches in a search order determined by search results, such as finding a depth candidate, the maximum amplitude correlation product value, and depth candidate distances. Also, in special processing sonar system 20 guards against false detections, such as false detections due to reverberations and false detections due to sonar pulses bouncing from the bottom to the surface and back to the bottom in double and triple bounces or more. Special processing at 508 is further described later in this specification. At 512, if a depth candidate is found during special processing at 510, sonar system 20 continues processing at 504. If a depth candidate is not found in special processing at 510, processing continues at 514 with normal processing.

In normal processing at 514, sonar system 20 executes moderate, deep, and shallow depth range searches to find a depth candidate. Normal processing at 514 is similar to the normal processing of FIG. 3. At 516, if a depth candidate is found during normal processing at 514, sonar system 20 continues processing at 504. If a depth candidate is not found in normal processing at 514, sonar system 20 repeats the search process until a depth candidate is found. In one embodiment, sonar system 20 repeats the search process beginning with the initial moderate depth range search at 500. In one embodiment, sonar system 20 repeats the search process beginning with special processing at 510 until a depth candidate is found.

Low correlation processing at 520 can be reached if sonar system 20 obtains low amplitude correlations and low amplitude correlation product values RP during previous searches. Low amplitude correlations and low amplitude correlation product values RP may be due to searching for a depth candidate in a highly sloped bottom region or in rough terrain.

In low correlation processing at 520, sonar system 20 stores the maximum amplitude correlation product value RP and the corresponding depth if the maximum amplitude correlation product value RP is greater than a low amplitude correlation product value threshold. The maximum amplitude correlation product value and corresponding depth are stored in a table. In one embodiment, sonar system 20 builds the table from previous searches. In one embodiment, sonar system 20 executes additional searches in low correlation processing at 520 to build the table.

Sonar system 20 including processor 32 locates a preliminary depth candidate DEPp in the table. Sonar system 20 also locates depth entries in the table that fall within a depth window of the preliminary depth candidate DEPp. The depth window is centered at the preliminary depth candidate DEPp and the depth window size is a function of the preliminary depth candidate DEPp as shown in Equation IV.

$$\text{DEPTH WINDOW SIZE} = \text{MAXIMUM (MIN, } R*DEPp) \qquad \text{Equation IV}$$

In Equation IV, the depth window size is equal to either a MIN value or R*DEPp, whichever is larger, where MIN is a predetermined minimum window size, R is a constant multiplier, and DEPp is the preliminary depth candidate.

Processor 32 sums the maximum amplitude correlation product values RP that correspond to depth entries located within the depth window. If the sum is greater than a low correlation sum threshold value, the preliminary depth candidate DEPp is declared a depth candidate and, at 522, processing continues at 504. If the sum is less than the low correlation sum threshold value, the preliminary depth candidate DEPp is discarded and, at 522, sonar system 20 repeats the search process. In one embodiment, sonar system 20 repeats the search process beginning with the initial moderate depth range search at 500. In one embodiment, sonar system 20 repeats the search process beginning with special processing at 510.

At 504, sonar system 20 executes a low signal amplitude test to guard against false detections and water noise. In the low signal amplitude test, processor 32 calculates one or more mean signal levels of electrical signals corresponding to the received reflected sonar pulses used to obtain the current depth candidate. The one or more mean signal levels are compared to a signal strength threshold level. If the one or more mean signal levels are greater than the signal strength threshold level, the depth candidate is confirmed. The depth candidate is discarded if the one or more mean signal levels are less than the signal strength threshold level.

In one embodiment, if the depth candidate was the result of a moderate depth range search, the mean signal level of electrical signals corresponding to the first received reflected sonar pulse is calculated and compared to a fixed signal strength threshold level. If the mean signal level corresponding to the first received reflected sonar pulse is greater than the signal strength threshold level, the depth candidate is confirmed. The depth candidate is discarded if the mean signal level is less than the fixed signal strength threshold level.

In one embodiment, if the depth candidate was the result of a deep depth range search, the mean signal levels of electrical signals corresponding to the second and third received reflected sonar pulses are calculated and compared to a noise adaptive signal strength level NAL, shown in Equation V.

$$NAL = \text{MINIMUM (FIXED, } K*\text{AMBIENT)} \qquad \text{Equation V}$$

In Equation V, NAL is equal to either FIXED or K*AMBIENT, whichever is less, where FIXED is a fixed signal strength threshold level, AMBIENT is the minimum noise amplitude from three noise measurements taken during the receive window corresponding to the current depth and K is a constant multiplier. If each of the mean signal levels corresponding to the second and third received reflected sonar pulses is greater than NAL, the depth candidate is confirmed. The depth candidate is discarded if each of the mean signal levels is less than NAL.

At 524, if the depth candidate is not confirmed, sonar system 20 repeats the search process. In one embodiment, sonar system 20 repeats the search process beginning with the initial moderate depth range search at 500. In one embodiment, sonar system 20 repeats the search process beginning with special processing at 510. If the depth candidate is confirmed, sonar system 20 continues processing at 526 with look back processing.

In look back processing at 526, sonar system 20 refines the distance measurement of the confirmed depth candidate to provide a more precise depth result at 528. Look back processing at 526 refines the location of the leading edge of the first received reflected sonar pulse to provide a more precise depth measurement. Look back processing at 526 is especially helpful in refining depth measurements taken over highly sloped ocean bottoms in the deep depth range, where the reflected sonar pulses are stretched and do not have well defined or sharp leading edges.

Processor 32 repeats amplitude correlation and amplitude correlation product value calculations starting a depth dependent time prior to the depth candidate time. Processor 32 compares the amplitude correlation product values to a lower amplitude correlation product threshold, where the first crossing of the lower amplitude correlation product threshold provides the final depth result at 528.

Figure 5A:
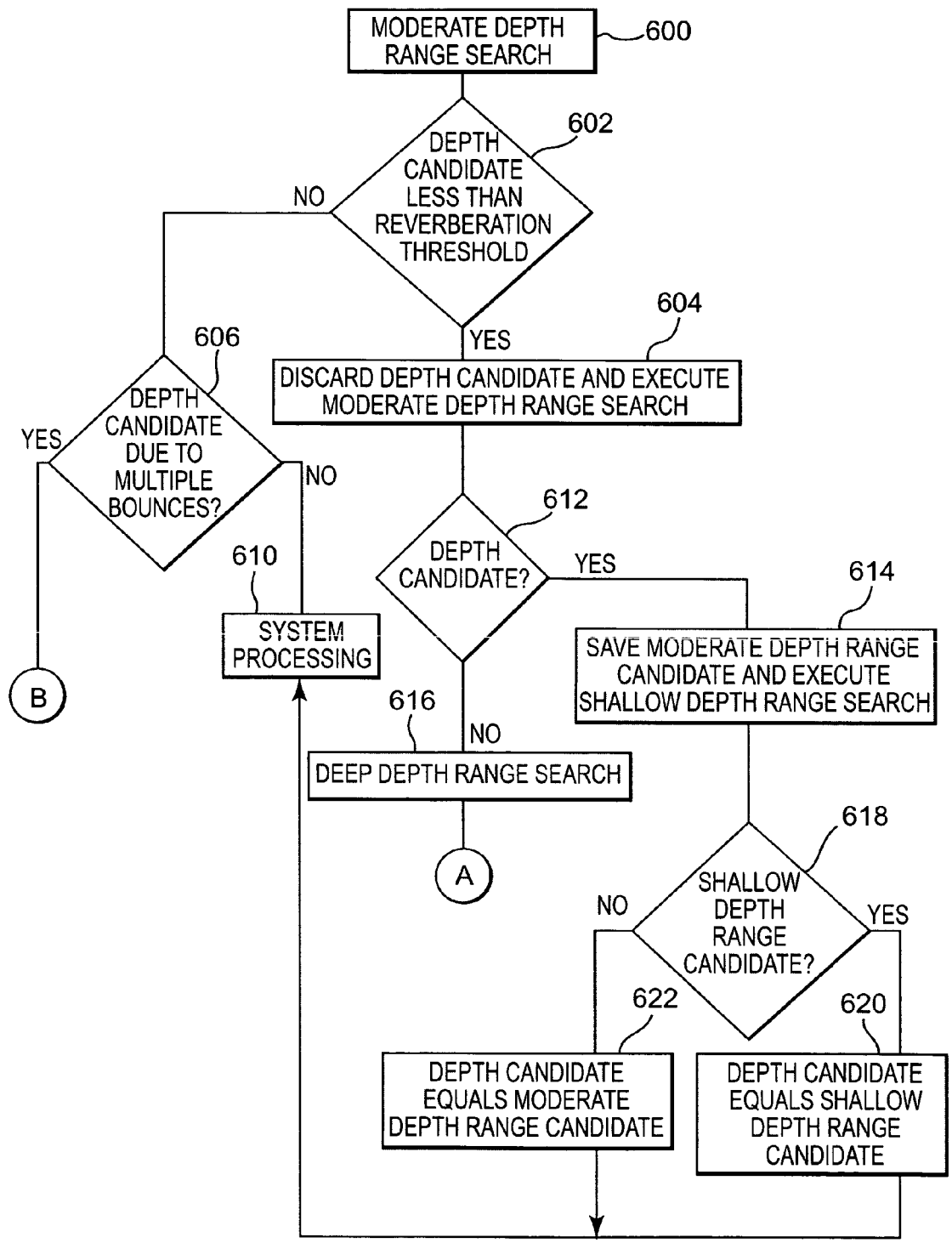
FIG. 5A is a flow diagram illustrating one part of special processing in one embodiment of a sonar system.
Figure 5B:
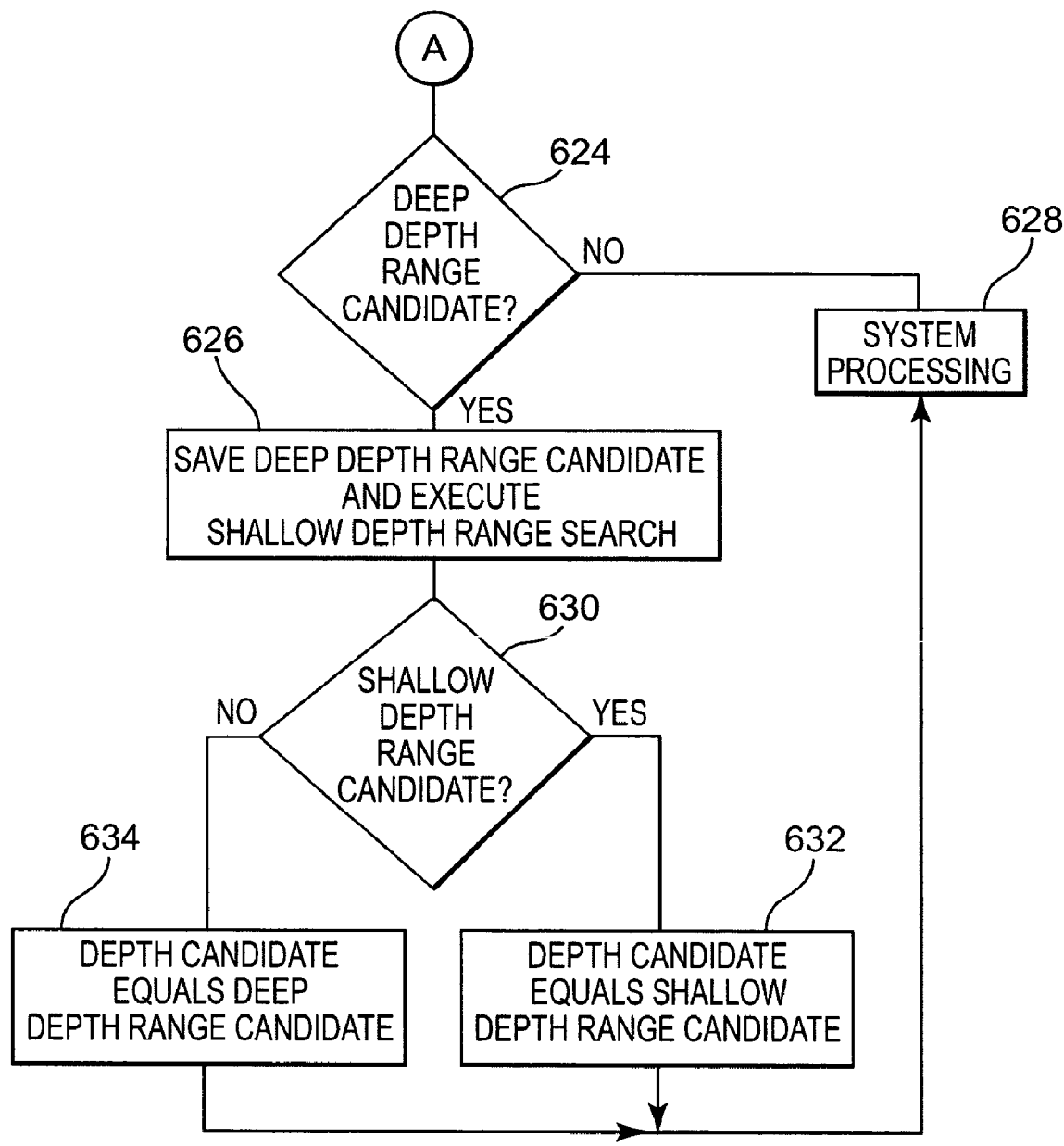
FIG. 5B is a flow diagram illustrating a second part of special processing in one embodiment of a sonar system.
Figure 5C:
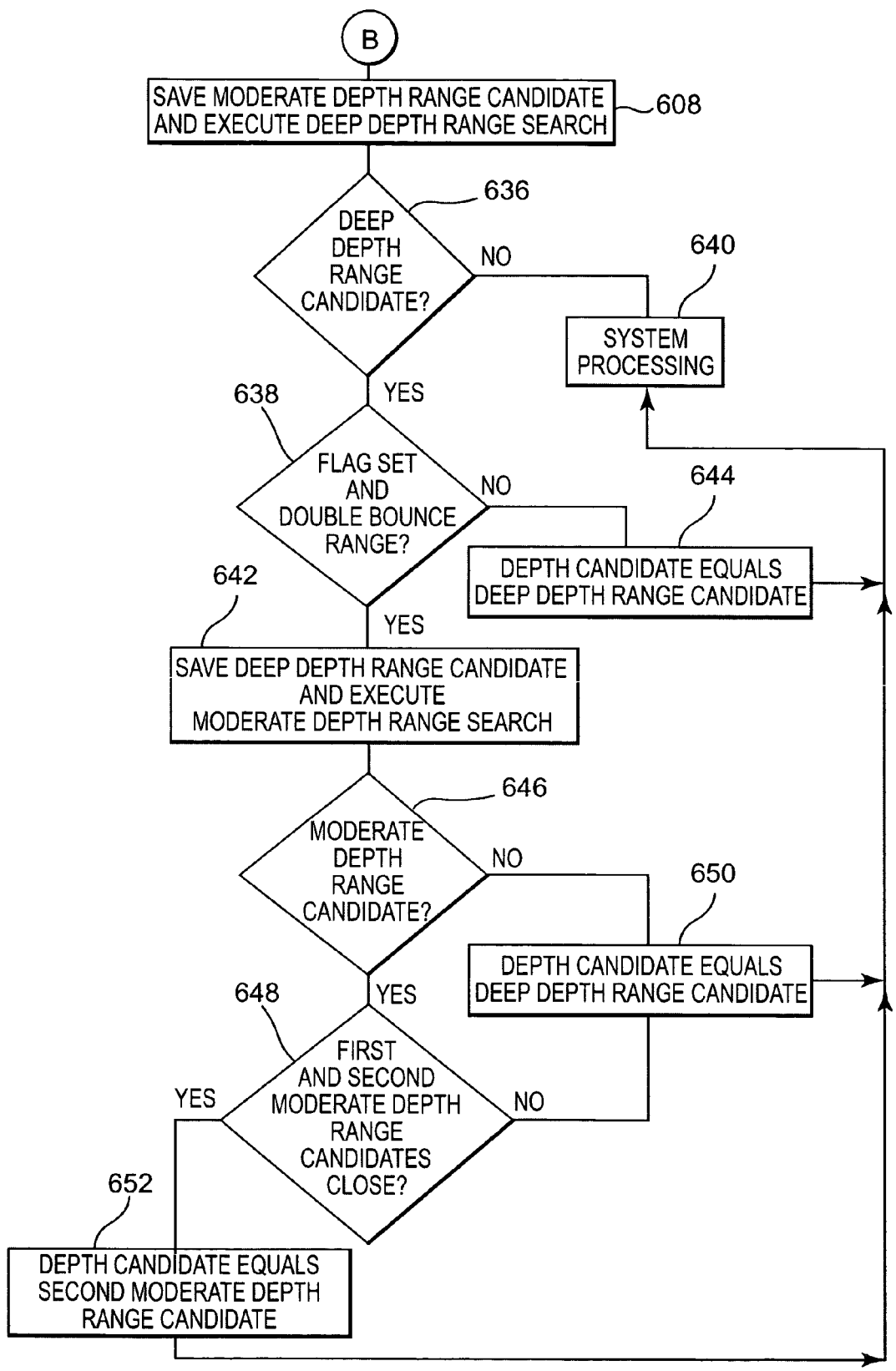
FIG. 5C is a flow diagram illustrating a third part of special processing in one embodiment of a sonar system.

FIGS. 5A-5C are flow diagrams illustrating special processing in one embodiment of sonar system 20. The special processing of FIGS. 5A-5C is one embodiment of special processing at 510 (shown in FIG. 4A). At 600 (shown in FIG. 5A), sonar system 20 executes a moderate depth range search to find a depth candidate. Sonar system 20 transmits sonar pulse sequence 100 and processor 32 opens receive window 102. Processor 32 samples and digitizes electrical signals received during the open receive window 102. Processor 32 calculates amplitude correlations and amplitude correlation products from the digitized samples to find a depth candidate. In one embodiment, in the moderate depth range search at 600, processor 32 opens receive window 102 earlier and leaves receive window 102 open longer than in other moderate depth range searches to find depth candidates in a shallower depth range as well as the moderate depth range.

At 602, if a depth candidate is found in the moderate depth range search at 600 and the depth candidate distance value is less than a reverberation threshold value, sonar system 20 continues processing at 604. The reverberation threshold value is set to distinguish pressure readings received by receiver 26, which may be due to reverberations from the transmitted sonar pulse sequence 100. If the depth candidate value is less than the reverberation threshold value, the depth candidate may be due to reverberations and processing continues at 604. If a depth candidate is not found in the moderate depth range search at 600 or the depth candidate value is greater than the reverberation threshold value, sonar system 20 continues processing at 606.

At 606, sonar system 20 determines if the depth candidate may be due to multiple bounces, such as sonar pulses in sonar pulse sequence 100 bouncing from the bottom to the surface and back to the bottom. The depth candidate may be due to multiple bounces if the depth candidate value is greater than a predetermined distance threshold. In one embodiment, sonar system 20 checks to see if the maximum amplitude product value RP is greater than an amplitude product threshold value and if the depth candidate distance value is greater than a predetermined distance threshold. If the maximum amplitude product value RP is greater than the amplitude threshold value and the depth candidate distance value is greater than the predetermined distance threshold, sonar system 20 continues processing at 608 (shown in FIG. 5C). If a depth candidate was not found in the moderate depth range search at 600 or the maximum amplitude product value RP is not greater than the amplitude threshold value or the depth candidate value is less than the predetermined distance threshold, sonar system 20 continues at 610 with system processing, such as at 512 (shown in FIG. 4A). In one embodiment, sonar system 20 continues at 610 with system processing, such as in normal processing and a deep depth range search at 514 (shown in FIG. 4A).

At 604, the depth candidate obtained in the moderate depth range search at 600 may be due to reverberations. Sonar system 20 discards this depth candidate and searches for another depth candidate in the same data gathered during receive window 102 of the moderate depth range search at 600, but starting later in the receive window 102. Processor 32 calculates amplitude correlations and amplitude correlation products from the digitized samples to find another depth candidate. At 612, if another depth candidate is found in the data from the moderate depth range search at 600, sonar system 20 continues processing at 614. If another depth candidate is not found, processing continues at 616 with a deep depth range search.

At 614, sonar system 20 stores the depth candidate found at 604 as a moderate depth range candidate and executes a shallow depth range search. The shallow depth range search is executed to sort out whether or not there is a shallow depth range candidate that is not due to reverberations. Sonar system 20 transmits sonar pulse sequence 300 and processor 32 opens receive window 302. Processor 32 samples and digitizes electrical signals received during the open receive window 302. Processor 32 calculates amplitude correlations and amplitude correlation products from the digitized samples to find a shallow depth range candidate. At 618, if a shallow depth range candidate is found in the shallow depth range search at 614, sonar system 20 continues processing at 620. If a shallow depth range candidate is not found in the shallow depth range search at 614, processing continues at 622.

At 620, the special processing depth candidate is set equal to the shallow depth range candidate and processing continues at 610. At 622, the special processing depth candidate is set equal to the moderate depth range candidate and processing continues at 610. Sonar system 20 continues at 610 with system processing, such as at 512 (shown in FIG. 4A).

At 616, sonar system 20 executes a deep depth range search. Sonar system 20 transmits sonar pulse sequence 200 and processor 32 opens receive window 202. Processor 32 samples and digitizes electrical signals received during the open receive window 202. Processor 32 calculates amplitude correlations and amplitude correlation products from the digitized samples to find a deep depth range candidate.

At 624 (shown in FIG. 5B), if a deep depth range candidate is found in the deep depth range search at 616, sonar system 20 continues processing at 626. If a deep depth range candidate is not found in the deep depth range search at 616, sonar system 20 continues at 628 with system processing, such as at 512 (shown in FIG. 4A). In one embodiment, sonar system 20 continues at 628 with system processing, such as in normal processing and a shallow depth range search at 514 (shown in FIG. 4A).

At 626, sonar system 20 stores the deep depth range candidate found at 616 and executes a shallow depth range search. The shallow depth range search is executed to sort out whether or not there is a shallow depth range candidate that is not due to reverberations. Sonar system 20 transmits sonar pulse sequence 300 and processor 32 opens receive window 302. Processor 32 samples and digitizes electrical signals received during the open receive window 302. Processor 32 calculates amplitude correlations and amplitude correlation products from the digitized samples to find a shallow depth range candidate. At 630, if a shallow depth range candidate is found in the shallow depth range search at 626, sonar system 20 continues processing at 632. If a shallow depth range candidate is not found in the shallow depth range search at 626, processing continues at 634.

At 632, the special processing depth candidate is set equal to the shallow depth range candidate and processing continues at 628. At 634, the special processing depth candidate is set equal to the deep depth range candidate and processing continues at 628. Sonar system 20 continues at 628 with system processing, such as at 512 (shown in FIG. 4A).

At 608 (shown in FIG. 5C), the depth candidate from the moderate depth range search at 600 is greater than the threshold value for possible multiple bounce issues. In resolving possible multiple bounce issues, sonar system 20 sets a flag and stores the moderate depth range candidate found at 600 as a first moderate depth range candidate. Sonar system 20 also executes a deep depth range search at 608. In the deep depth range search, sonar system 20 transmits sonar pulse sequence 200 and processor 32 opens receive window 202. Processor 32 samples and digitizes electrical signals received during the open receive window 202. Processor 32 calculates amplitude correlations and amplitude correlation products from the digitized samples to find a deep depth range candidate.

At 636, if a deep depth range candidate is found in the deep depth range search at 608, sonar system 20 continues processing at 638. If a deep depth range candidate is not found in the deep depth range search at 608, sonar system 20 clears the flag and discards the first moderate depth range candidate. At 640, sonar system 20 continues with system processing, such as at 512 (shown in FIG. 4A). In one embodiment, sonar system 20 continues at 640 with system processing, such as in normal processing and a shallow depth range search at 514 (shown in FIG. 4A).

At 638, sonar system 20 including processor 32 checks to see if the flag is set and if the deep depth range candidate is twice the first moderate depth range candidate. The deep depth range candidate is in a double bounce range if the deep depth range candidate is twice the first moderate depth range candidate, and processing continues at 642 to resolve the multiple bounce issue. If the deep depth range candidate is not in the double bounce range, sonar system 20 sets the special processing depth candidate equal to the deep depth range candidate at 644 and processing continues at 640 with system processing, such as at 512 (shown in FIG. 4A).

At 642, sonar system 20 stores the deep depth range candidate found at 608 and executes a second moderate depth range search. In the second moderate depth range search at 642, sonar system 20 transmits sonar pulse sequence 100 and processor 32 opens receive window 102. Processor 32 samples and digitizes electrical signals received during the open receive window 102. Processor 32 calculates amplitude correlations and amplitude correlation products from the digitized samples to find a moderate depth range candidate.

At 646, if a moderate depth range candidate is found in the second moderate depth range search at 642, sonar system 20 stores the moderate depth range candidate as a second moderate depth range candidate and continues processing at 648. If a moderate depth range candidate is not found in the second moderate depth range search at 642, sonar system 20 continues processing at 650 by clearing the flag and setting the special processing depth candidate equal to the deep depth range candidate found at 608. Processing continues at 640 with system processing, such as at 512 (shown in FIG. 4A).

At 648, if the second moderate depth range candidate is near the first moderate depth range candidate, sonar system 20 clears the flag and at 652 sets the special processing depth candidate equal to the second moderate depth range candidate found at 642. Processing continues at 640 with system processing, such as at 512 (shown in FIG. 4A). If the second moderate depth range candidate is not near the first moderate depth range candidate, sonar system 20 clears the flag and at 650 sets the special processing depth candidate equal to the deep depth range candidate found at 608. Processing continues at 640 with system processing, such as at 512 (shown in FIG. 4A).

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A sonar system, comprising:
a transmitter adapted to provide pulse sequences, wherein each of the pulse sequences includes pulses that reflect off an object;
a receiver adapted to receive the reflected pulses; and
a processor configured to transmit a first pulse sequence via the transmitter to obtain a first distance to the object in a first distance range and to transmit a second pulse sequence via the transmitter to obtain a second distance to the object in a second distance range, wherein the processor is configured to transmit the second pulse sequence in response to being unable to obtain the first distance to the object in the first distance range.

2. The sonar system of claim 1, wherein the processor is configured to transmit a third pulse sequence via the transmitter to obtain a third distance to the object in a third distance range, wherein the processor is configured to transmit the third pulse sequence in response to being unable to obtain at least one of the first distance to the object in the first distance range and the second distance to the object in the second distance range.

3. The sonar system of claim 1, wherein at least one characteristic of the first pulse sequence transmitted by the processor is different than the at least one characteristic of the second pulse sequence transmitted by the processor.

4. The sonar system of claim 3, wherein the at least one characteristic includes at least one of pulse spacing, pulse width, pulse power, and pulse number.

5. The sonar system of claim 1, wherein the processor is configured to open a first receive window following the last pulse in the first pulse sequence and a second receive window following the last pulse in the second pulse sequence.

6. The sonar system of claim 5, wherein a first time between opening the first receive window and the last pulse in the first pulse sequence is different than a second time between opening the second receive window and the last pulse in the second pulse sequence.

7. The sonar system of claim 1, wherein the first pulse sequence comprises a first series of 3 to 10 pulses and the second pulse sequence comprises a second series of 3 to 10 pulses.

8. The sonar system of claim 1, wherein the pulses in the first pulse sequence and the pulses in the second pulse sequence are directed downward to reflect off the ocean bottom.

9. The sonar system of claim 1, wherein the processor is configured to determine the first distance and the second distance based on the time between transmitting pulses via the transmitter and receiving reflected pulses via the receiver.

10. The sonar system of claim 9, wherein the processor is configured to obtain samples of the received reflected pulses, to digitize the samples of the received reflected pulses, and for selected samples to calculate amplitude correlations of groups of received reflected pulses to calculate a correlation product value.

11. The sonar system of claim 10, wherein the processor is configured to determine a maximum correlation product value for the selected samples, to compare the maximum correlation product value to a correlation product threshold, and if the maximum correlation product value exceeds the correlation product threshold obtain one of the first distance and the second distance based on the selected samples used to calculate the maximum correlation product value.

12. A sonar system, comprising:
a transmitter adapted to provide pulse sequences, wherein each of the pulse sequences includes pulses to reflect off an object;
a receiver adapted to receive the reflected pulses; and
a processor configured to transmit a first pulse sequence via the transmitter and open a first receive window following the last pulse in the first pulse sequence to receive reflected pulses from the first pulse sequence via the receiver and obtain a first distance to the object in a first depth range, and to transmit a second pulse sequence via the transmitter and open a second receive window following the last pulse in the second pulse sequence to receive reflected pulses from the second pulse sequence via the receiver and obtain a second distance to the object in a second distance range, wherein the processor is configured to transmit the second pulse sequence in response to being unable to obtain the first distance to the object in the first depth range.

13. The sonar system of claim 12, wherein pulses in the second pulse sequence are higher energy pulses than pulses in the first pulse sequence, and pulses in the second pulse sequence are spaced further apart than pulses in the first pulse sequence.

14. The sonar system of claim 13, wherein the higher energy pulses are higher power pulses than pulses in the first pulse sequence, and the higher energy pulses are about the same width as pulses in the first pulse sequence.

15. The sonar system of claim 13, wherein a first time from the last pulse in the first pulse sequence to opening the first receive window is shorter than a second time from the last pulse in the second pulse sequence to opening the second receive window.

16. The sonar system of claim 12, wherein pulses in the first pulse sequence are spaced apart in at least two unequal first spacing times, and pulses in the second pulse sequence are spaced apart in at least two unequal second spacing times.

17. The sonar system of claim 12, wherein the processor is configured to transmit a third pulse sequence via the transmitter and open a third receive window following the last pulse in the third pulse sequence to receive reflected pulses from the third pulse sequence via the receiver and obtain a third distance to the object in a third depth range.

18. The sonar system of claim 17, wherein pulses in the third pulse sequence are lower energy pulses than pulses in the first pulse sequence, and pulses in the third pulse sequence are spaced closer together than pulses in the first pulse sequence.

19. The sonar system of claim 18, wherein a third time from the last pulse in the third pulse sequence to opening the third receive window is shorter than a first time from the last pulse in the first pulse sequence to opening the first receive window.

20. A depth detection system, comprising:
a transmitter adapted to provide sonar pulses in sonar pulse sequences;
a receiver adapted to receive reflected sonar pulse signals; and
a processor configured to provide the sonar pulse sequences and process the received reflected sonar pulse signals to obtain a depth candidate, wherein the processor provides an initial sonar pulse sequence to obtain the depth candidate in a first depth range and if unsuccessful in obtaining the depth candidate in the first depth range the processor provides a second sonar pulse sequence to obtain the depth candidate in a second depth range and if unsuccessful in obtaining the depth candidate in the second depth range the processor provides special processing to obtain the depth candidate.

21. The depth detection system of claim 20, wherein the processor provides the initial sonar pulse sequence to obtain the depth candidate in a moderate depth range and the second sonar pulse sequence to obtain the depth candidate in a deep depth range, wherein the moderate depth range is shallower than the deep depth range.

22. The depth detection system of claim 20, wherein the special processing provided by the processor includes sonar pulse sequences adapted to obtain the depth candidate in a moderate depth range, a shallow depth range, and a deep depth range.

23. The depth detection system of claim 20, wherein the special processing provided by the processor protects against obtaining false depth candidates obtained from sonar pulse transmission reverberations.

24. The depth detection system of claim 20, wherein the special processing provided by the processor protects against obtaining false depth candidates from double bounce reflected sonar pulses.

25. The depth detection system of claim 20, wherein the processor is configured to test one or more amplitude levels of the received reflected sonar pulse signals to protect against obtaining false depth candidates.

26. The depth detection system of claim 20, wherein the processor is configured to provide look back processing of the received reflected sonar pulse signals to obtain the depth.

27. The depth detection system of claim 20, wherein the processor is configured to provide a reduced correlation product depth candidate if the processor is unsuccessful in obtaining the depth candidate with the initial pulse sequence, second pulse sequence and special processing.

28. A method for detecting depth, comprising:
transmitting first pulses in a first pulse sequence to search for a first depth candidate in a first depth range;
determining if the first pulses in the first pulse sequence obtains the first depth candidate in the first depth range, and
transmitting second pulses in a second pulse sequence to search for a second depth candidate in a second depth range if unsuccessful in obtaining the first depth candidate in the first depth range.

29. The method of claim 28, comprising:
correlating amplitudes in reflected first pulse signals to obtain the first depth candidate; and correlating amplitudes in reflected second pulse signals to obtain the second depth candidate.

30. The method of claim 28, comprising:
transmitting third pulses in a third pulse sequence to search for a third depth candidate in a third depth range if unsuccessful in obtaining the first depth candidate in the first depth range and the second depth candidate in the second depth range.

31. The method of claim 30, comprising:
correlating amplitudes in reflected third pulse signals to obtain the third depth candidate.

32. The method of claim 28, wherein at least one characteristic of the first pulse sequence is different than the at least one characteristic of the second pulse sequence and the at least one characteristic includes at least one of pulse spacing, pulse width, pulse power, and pulse number.

33. The method of claim 28, comprising:
opening a first receive window following the last first pulse in the first pulse sequence; and
opening a second receive window following the last second pulse in the second pulse sequence.

34. The method of claim 33, where a first time from the last first pulse in the first pulse sequence to opening the first receive window is different than a second time from the last second pulse in the second pulse sequence to opening the second receive window.

* * * * *